United States Patent [19]

Lloyd

[11] Patent Number: 5,002,184
[45] Date of Patent: Mar. 26, 1991

[54] SOFT CASE PROTECTION FOR A HAND HELD COMPUTER

[75] Inventor: Graham P. Lloyd, Fremont, Calif.

[73] Assignee: GRiD Systems Corporation, Fremont, Calif.

[21] Appl. No.: 364,925

[22] Filed: Jun. 12, 1989

[51] Int. Cl.⁵ .............................................. B65D 85/38
[52] U.S. Cl. ..................... 206/305; 206/523; 206/576; 206/592; 220/902; 235/1 D
[58] Field of Search ............... 206/305, 320, 523, 524, 206/569, 576, 594, 592; 235/1 D; 220/902

[56] References Cited

U.S. PATENT DOCUMENTS

| | | | |
|---|---|---|---|
| 3,243,037 | 3/1966 | Luertzing | 206/592 |
| 4,219,945 | 9/1980 | Rudy | 36/29 |
| 4,259,568 | 3/1981 | Dynesen | 206/305 |
| 4,420,078 | 12/1983 | Belt et al. | 206/305 |
| 4,424,899 | 1/1984 | Rosenberg | 206/305 |
| 4,681,227 | 7/1987 | Temura et al. | 206/594 |
| 4,703,161 | 10/1987 | McLean | 206/523 |
| 4,733,776 | 3/1988 | Ward | 206/523 |
| 4,762,227 | 8/1988 | Patterson | 206/523 |
| 4,768,648 | 9/1988 | Glass | 206/305 |
| 4,770,328 | 9/1988 | Dichkudt et al. | 206/305 |
| 4,817,304 | 4/1989 | Parker et al. | 36/29 |
| 4,824,059 | 4/1989 | Butler | 206/523 |

FOREIGN PATENT DOCUMENTS 2370450  7/1978  France ..................... 206/305

Primary Examiner—David T. Fidei
Attorney, Agent, or Firm—Townsend & Townsend

[57] ABSTRACT

A soft case which encloses a portable device such as a hand held computer has a top cover portion which overlies a large screen at the front or top of the computer. This cover portion has a flat, soft foam pad which engages against the glass screen to cushion the screen and spread the force of any impact against the closed case at the screen. Further, there may be included in the screen cover a rigid member captured within the injection molded foam and spanning across the screen, providing further protection against impact to the screen.

24 Claims, 3 Drawing Sheets

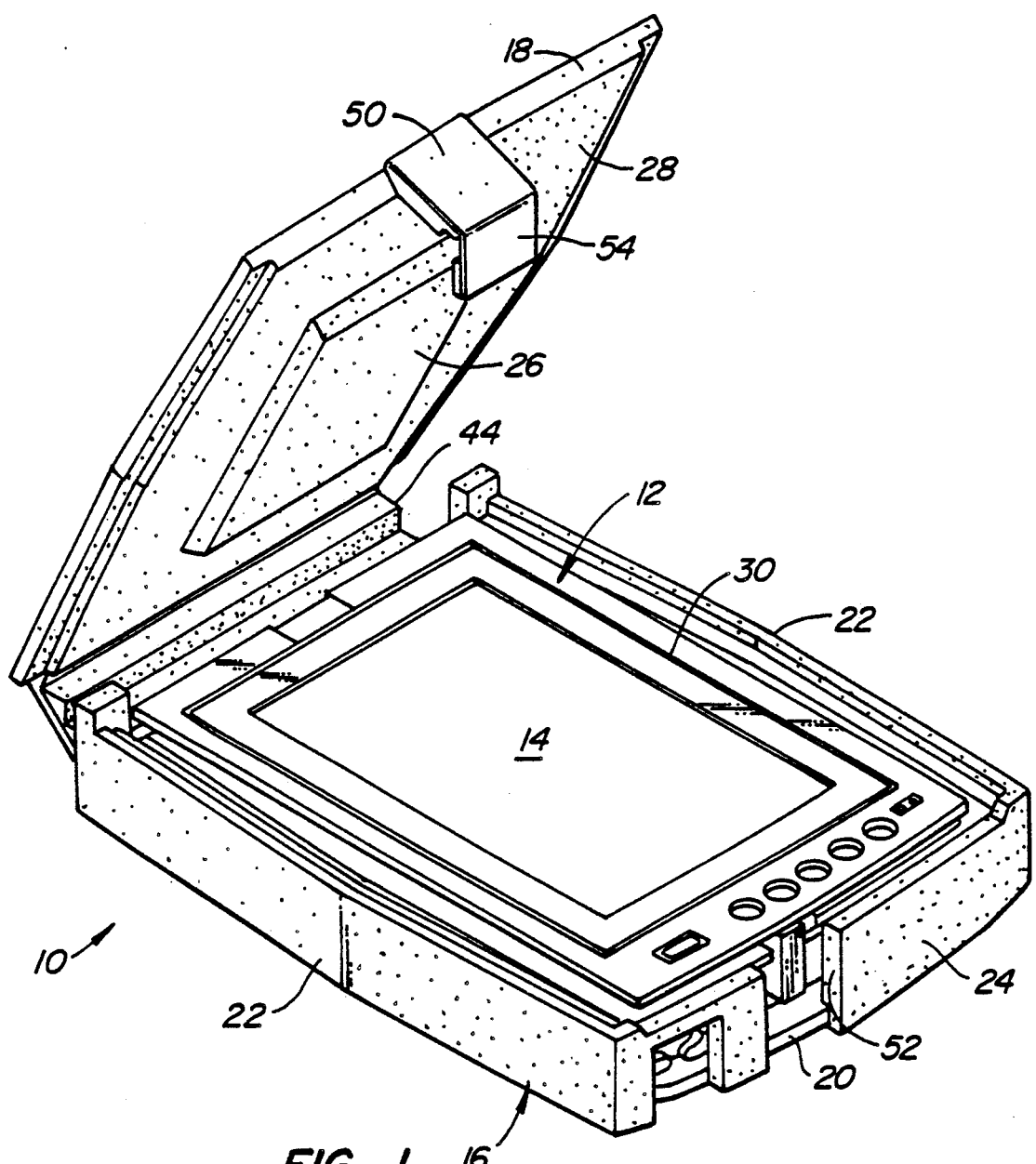
FIG._1.
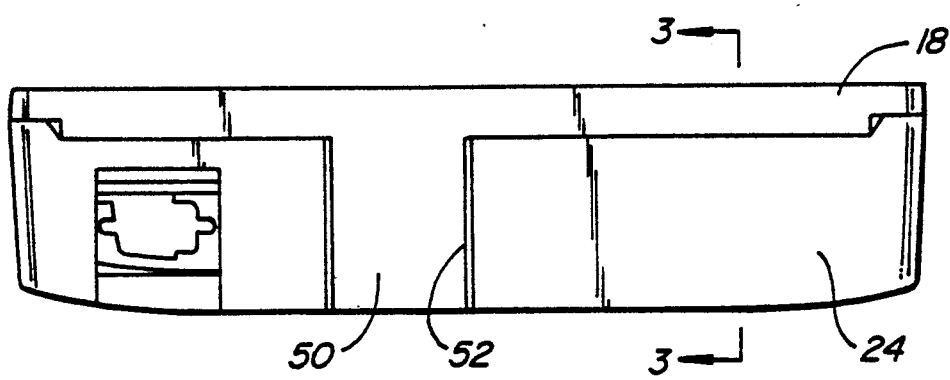
FIG._2.

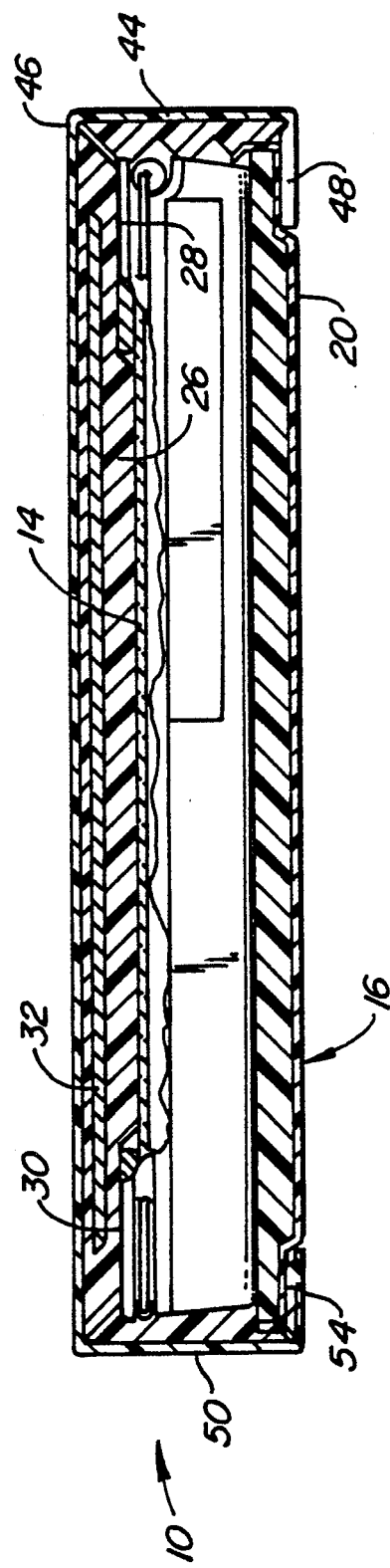
FIG._3.
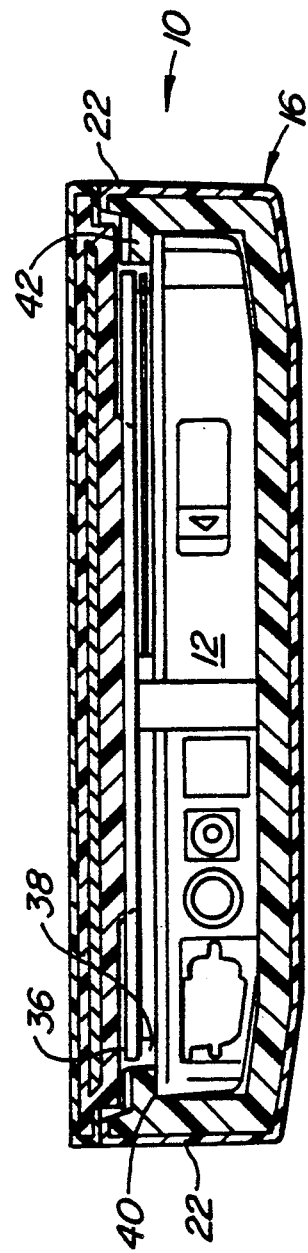
FIG._4.

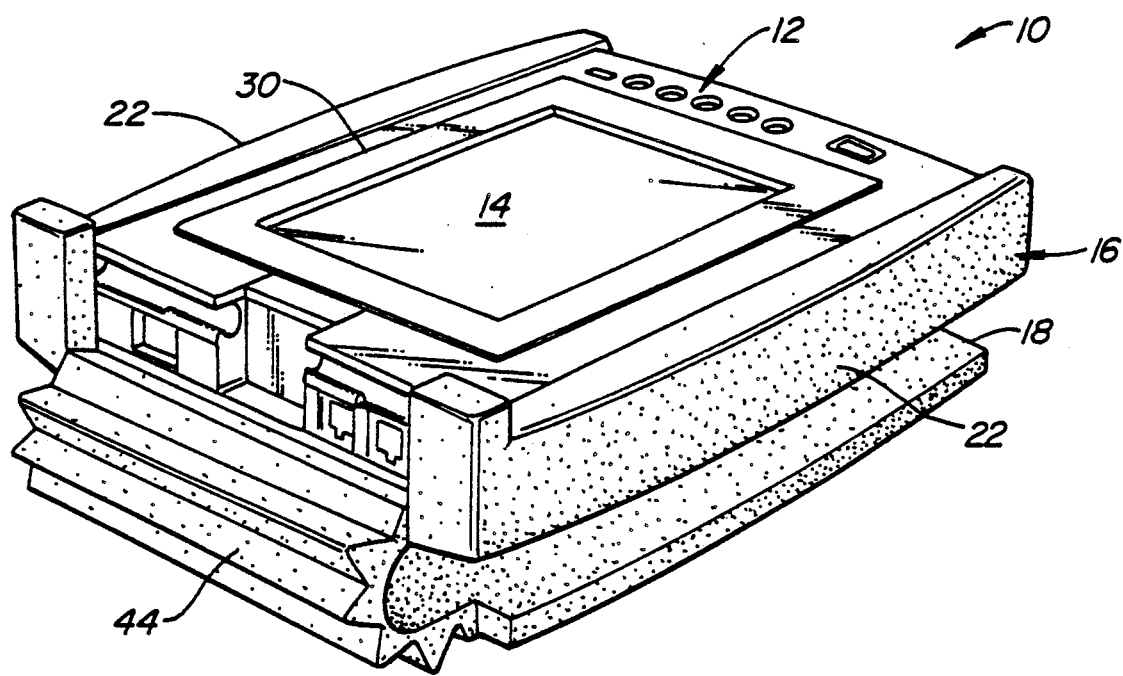
FIG._5.

SOFT CASE PROTECTION FOR A HAND HELD COMPUTER

BACKGROUND OF THE INVENTION

The invention relates in general to cases and covers for protection of electrical devices, and in particular the invention is concerned with a protective soft foam case particularly adapted for a hand held computer having a screen which could be subject to damage from impact loading.

A number of items of portable equipment such as still cameras, video cameras, computers, small televisions and electronic games have had fitted protective cases for the covering and cushioning of particularly vulnerable elements. These generally have been of relatively dense material, such as a hard case typically available for 35 mm cameras.

In a class of computers known as hand held computers, there is usually included a small screen which can be vulnerable to damage from impact loads or strong forces pressed against the screen. Such hand held computers are typically used by route sales and delivery people, inventory personnel and others with travelling data gathering functions.

Unlike the screen on a conventional portable or laptop computer wherein the screen is pivoted out from a casing for use and protected when the casing is closed, hand held computers have screens which are essentially unprotected in the absence of any cover or case.

In U.S. patent application Ser. No. 07/365,147 entitled "Hand Held Computer", filed concurrently with this application, assigned to the same assignee as the present invention and incorporated herein by reference, there is disclosed a different type of hand held computer, of very thin profile, light weight, easily portable dimensions and with a large screen having dimensions each more than half the length of the corresponding side of the housing or face of the computer. The area of the screen may be about half or more the area of the front of the computer. No keyboard is included on this hand held, notebook style computer, but the computer has a write screen function for inputting information to the screen and into the computer using a stylus or pen, and a keyboard can be called up onto a portion of the screen if needed.

For this type of hand held computer, the need for protection of the large screen is particularly acute. Merely covering the screen with a rigid but thin foam case would not protect the screen, which may be a liquid crystal display, from impact loads to which the computer is often subjected during travel and in field use.

The conventional, smaller-screen hand held computers referenced above also need reliable protection against screen damage, as do small portable televisions and other portable devices with vulnerable external elements.

SUMMARY OF THE INVENTION

In accordance with the present invention a soft foam case is provided for such a vulnerable portable device, particularly a hand held computer, for affording a high degree of protection to a vulnerable external element such as a screen which would otherwise be subject to damage from impact loading.

The protective case of the present invention utilizes soft foam molding technology and particular design features to result in a relatively lightweight case which is easily opened and closed and which protects the screen of a portable computer in several different ways. The soft foam preferably is molded by a process used previously for automotive interior components, using a neoprene polyethylene and polypropylene alloy which is foamed during the molding process.

The computer case preferably includes a relatively flat base and a cover secured to the base by a hinge at one end. At an opposite end a latch is provided to secure the cover in a closed position on the base.

The cover has a screen-engaging pad which may protrude inwardly to make contact with the screen through substantially the entire area of the screen. This pad is of soft foam and conforms to the screen, thereby protecting the screen by spreading the force of any applied loads which reach this pad area.

In addition, the soft foam cover may have captured within it a piece of rigid material, preferably a rigid perforated plate of aluminum or plastic, that bridges or spans across the computer screen. The sheet of rigid material is larger than the dimensions of the screen, so as to transfer any high pressures or impact loads applied at the outside of the cover to the outside edges of the computer, i.e. a rigid frame surrounding the screen and capable of bearing relatively high loading.

If pressure or impact is applied sufficient to deflect the rigid plate downwardly toward the screen, the foam pad under the rigid plate will spread this deflection loading over a wider area of the screen, thus still preventing damage to the screen except under extreme load conditions.

In one embodiment of the invention, a soft foam case for covering a portable device having a large frontal screen includes a base portion and a cover portion secured to the base portion, with the cover portion extending over the screen and including screen padding means for engaging substantially the entire screen to cushion and distribute any impact or pressure occurring to the cover portion at the screen. The case preferably is formed of an injection molded neoprene polyethylene and polypropylene alloy which is foamed into a closed-cell foam during molding.

It is therefore among the objects of the present invention to provide a high degree of protection for a portable device having exterior vulnerable elements, with a soft foam case which closely fits the device and which has particular features which cooperate to protect a large fragile element such as a screen of a hand held computer.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

DESCRIPTION OF THE DRAWINGS

FIG. 1 is a perspective view showing a hand held computer as contained in a soft foam case having fea- FIG. 2 is an end view of the case, in a closed position about the computer.

FIG. 3 is a sectional elevation view showing the closed case with the computer inside.

FIG. 4 is a transverse cross sectional view showing the computer case and indicating a manner of engagement with one form of hand held computer FIG. 5 is a perspective view showing the computer case of the invention with a cover portion fully opened and folded back, in a position of use.

DESCRIPTION OF THE PREFERRED EMBODIMENTS

In the drawings, FIG. 1 shows a computer case 10 secured to a portable computer 12, shown as a hand held computer as referenced above. The invention is particularly concerned with the protection of a large screen 14 such as included on the front or upper side of the computer 12, although other vulnerable elements of portable devices and the smaller screens of other types of hand held computers can also be protected using the principles of the invention. The protective case 10 includes a base 16 and a cover 18. As illustrated, the base 16 preferably has a bottom portion 20 and a pair of side walls 22 and an end wall 24. In accordance with the invention the protective case 10, including the base 16 and the cover portion 18, is produced by soft foam molding technology. Such molding has generally not been previously applied to protective covers or cases, typically having been used in the production of automotive interior components.

The cover 18 of the case 10 includes an inner pad 26 of relatively large area, for direct engagement against the surface of the screen 14. The soft foam in the pad area 26 and the remaining thickness of the cover 18 above helps spread any impact loads to the outside of the cover over a larger area of the vulnerable screen 14 thereby reducing the possibility of fracture or other damage to the screen 14. The pad area 26 is substantially the same size as the screen 14, and it protrudes outwardly from the inner surface 28 of the cover just sufficiently to engage the slightly recessed screen 14 while the remainder of the inner surface engages against a rigid frame 30 surrounding the screen and extending from the edge of the screen to the edge of the computer.

As shown in the longitudinal sectional view of FIG. 3, the cover 18 of the case also includes a rigid member 32 encapsulated within the molded cover 18. The member 32 preferably is a sheet or plate of rigid material such as perforated aluminum or rigid plastic. It has relatively high bending resistance, so as to receive external impacts applied to the outside of the cover and transfer such loading to the shoulder or edge areas 30 of the computer, rather than to the screen 14. For example, the rigid plastic member may comprise a ⅛ inch thick sheet of perforated rigid plastic or a thinner sheet of perforated aluminum, for lightness of weight.

The molded case, including the base 16 and the cover 18, preferably also has a bonded fabric material on all inside surfaces, particularly those coming into engagement with the computer 12. This may be a polyester fabric bonded to the molded foam material during the molding process referred to above.

The soft foam material of the case 10 preferably comprises an elastomeric material which is injection molded and foamed during the molding process. This soft foam molding process, as discussed above, has previously been used for automotive parts such as energy-absorbing dashboards, arm rests, visors, etc., and also by some furniture manufacturers. The process used may be the patented process of Hettinga Equipment of Des Moines, Iowa. In this molding procedure, the fabric at the interior of the case, preferably a polyester fabric, is laid in the mold cavity before the molding material is injected. The material is then injected in a molten state, at low pressure and slowly, in accordance with the Hettinga process. In the mold it solidifies into a closed cell foam. The molten injection material, which may be Monsanto's Santoprene (neoprene polyethylene and polypropylene alloy) becomes securely bonded to the fabric as the material solidifies. It also forms a tough skin on the other, non-fabric covered surfaces, with a texture picked up from etched mold surfaces.

The addition of the bonded polyester fabric enables the computer to be inserted into the case with a smoother and more comfortable motion and provides a clean-appearing surface on the inside of the case.

It is important that the weight of the computer case 10 be kept at a minimum. In an alternate embodiment of the present invention, the Monsanto Santoprene injection molding material still forms the skin of the case surfaces, but a thermal formed foam insert is laid into the mold cavity to occupy most of the volume of each of the cover, wall, bottom and end components of the case. Such thermal formed foam may have a density of only about two pounds per cubic foot, much less than the foamed Santoprene material. Thus, the thermal formed foam inserts take up a majority of the volume of the computer case, while the Santoprene material still provides the firm skins and edges of the case components.

FIG. 4 shows another important feature of the present invention. The soft foam case 10 preferably is used with a tablet type, hand held computer 12 which has a terraced configuration seen in FIG. 1 and in FIG. 4, as disclosed in the copending application referenced above. In this configuration, an upper peripheral flange or ledge 36 overhangs a recess or channel 38, below which is a lower shoulder or ledge 40 which extends farther outward. The soft foam case 10 of the invention has side walls 22 which include inwardly extending rails or lips 42. As shown in FIG. 4, these engage over the lower shoulder or ledge 40 of the computer 12. The computer is inserted into the base portion 16 of the case by sliding it between the side walls 22, with the lips 42 engaged as shown. In this way the computer is held firmly within the case.

FIG. 5 shows the case 10 with the cover 18 folded back and under the base 16, in a position of use of the computer 12. Also, the computer 12 can be inserted into or removed from the case with the cover in this position, by sliding it outwardly away from the end 24.

As shown in FIG. 3, FIG. 5 and also in FIG. 1, at one end of the case 10 is a hinge 44 securing the cover 18 to the base 16. The hinge 44 holds the cover to the base when the cover is folded back to the position of use shown in FIG. 5. As FIG. 3 indicates, the hinge 44 may be produced integrally with the cover 18, secured to the top cover portion 18 by a narrowed thickness 46 of the molded soft foam material, including the tough outer skin of the molded foam material.

FIG. 3 also shows a connecting flap 48 at the lower side of the hinge 44, for permanently securing to the bottom 20 of the base 16, as by adhesive bonding or by stitching.

At the other end of the bottom 20, as shown in FIG. 3 and FIG. 1, a latch 50 extending from a front edge of the cover 18 and optionally integral therewith can be pulled down through a notch opening 52 in the front end wall 24 of the case and secured to the bottom 20 via a latch flap 54. This connection may be by hook and loop fasteners such as Velcro, or by snap fasteners or other appropriate quickly releasable latching device.

FIG. 2 shows the latch 50 in an elevation view looking at the end 24 of the computer case, and in the closed and latched position. The notch 52 in the front end wall 24 enables the wall to have a substantially flush appearance and feel when the case is closed.

While I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. A case for covering a hand held computer having a large frontal screen and a rigid frame around the screen,
   and for protecting the screen against impact, comprising,
   a base portion of the case and a cover portion of the case secured to the base portion,
   the cover portion being formed of a compressible material and extending over the computer screen and including screen padding means for engaging substantially the entire screen to cushion and distribute any impact or pressure occurring to the cover portion at the screen, and
   the screen cover portion further including a rigid member encapsulated within the cover portion and of a larger dimension than the screen so as to span across the screen and overlap the rigid frame, for further preventing impact or pressure from being transferred to the screen by transferring pressure to the rigid frame.

2. A computer case according to claim 1, wherein the rigid member comprises a substantially planar sheet of rigid material having both length and width dimensions greater than those of the screen.

3. A computer case according to claim 2, wherein the cover portion comprises an injection molded soft foam material.

4. A computer case according to claim 1, wherein the base portion of the case engages a bottom surface of the computer and including hinge means at one end of the case for connecting the base portion to the cover portion and for permitting the cover portion to be swung up from the computer screen and folded around to the bottom of the computer, below the base portion, and further including latch means at an opposite end of the computer from the hinge means, for holding the case in a closed position.

5. A computer case according to claim 1, wherein at least the cover portion comprises an injection molded elastomeric soft foam, and wherein the rigid member is capture molded within the soft foam cover portion.

6. A computer case according to claim 1, wherein at least the cover portion of the case is formed on an injection molded, self skinning, elastomeric closed-cell soft foam.

7. A computer case according to claim 6, wherein the elastomeric closed-cell soft foam comprises a neoprene polyethylene and polypropylene alloy material foamed during molding.

8. A computer case according to claim 7, further including a bonded fabric on the inner surface of the foam.

9. A soft foam case for covering a portable device having a large frontal screen, and for protecting the screen against impact, comprising,
   a base portion of the case and a cover portion of the case secured to the base portion,
   the cover portion extending over the screen and including screen padding means for engaging substantially the entire screen to cushion and distribute any impact or pressure occurring to the cover portion at the screen,
   the case being formed of an injection molded neoprene polyethylene and polypropylene alloy which is foamed into a closed-cell soft foam during molding,
   the portable device having a rigid frame surrounding the screen, and the screen cover portion further including a rigid member encapsulated within the cover portion and a larger dimension than the screen so as to span across the screen and overlap the rigid frame, for further preventing impact or pressure from being transferred to the screen by transferring pressure to the rigid frame.

10. A soft foam case according to claim 9, wherein the rigid member comprises a substantially planar sheet of rigid material having both length and width dimensions greater than those of the screen, and capture molded within the cover portion.

11. In combination with a hand held computer having a large frontal screen and a rigid frame around the screen, a case for covering and protecting the computer and for protecting the screen against impact, comprising,
   a base portion of the case and a cover portion of the case secured to the base portion,
   the cover portion being formed of a compressible material and extending over the computer screen and including screen padding means for engaging substantially the entire screen to cushion and distribute any impact or pressure occurring to the cover portion at the screen,
   the computer having a terraced configuration with a lower shoulder or ledge below the rigid frame and extending outwardly beyond the frame at least on two opposed sides of the computer, with a channel formed between the upper and lower ledges, and
   the base portion of the case having a pair of side walls positioned to engage against said two opposed sides of the computer and the side walls each including inwardly extending rails oriented longitudinally along the side walls, positioned to engage over the upper surface of the lower shoulder or ledge.

12. A computer case according to claim 11, wherein the base portion of the case engages a bottom surface of the computer and including hinge means at one end of the case for connecting the base portion to the cover portion and for permitting the cover portion to be swung up from the computer screen and folded around to the bottom of the computer, below the base portion, with the hinge means turned downwardly and opening said one end and further including latch means at an opposite end of the case so that the computer may be removed by sliding it out between the side walls.

13. A computer case according to claim 11, wherein at least the cover portion of the case is formed of an injection molded, self skinning, elastomeric closed-cell soft foam.

14. A computer case according to claim 13, wherein the elastomeric closed-cell soft foam comprises a neoprene polyethylene and polypropylene alloy material foamed during molding.

15. A computer case according to claim 14, further including a bonded fabric on the inner surface of the foam.

16. A computer case according to claim 11 wherein the side walls and rails of the base portion are formed of a compressible material.

17. A computer case according to claim 16 wherein the side walls and rails are formed from the same compressible material as the cover portion.

18. A computer case according to claim 16 wherein the rails substantially fill the channels when the computer is inserted into the case.

19. A computer case for covering a hand held computer having a screen and a rigid frame around the screen and for protecting the screen against impact, the screen surface being recessed below the frame surface, the case comprising:

a base and a cover secured to the base, the cover being formed of a compressible material and having a portion extending over the computer screen and a portion extending over the frame, the portion of the cover over the screen extending below the portion of the cover over the frame in substantially the same amount that the screen is recessed below the frame.

20. The computer case of claim 19 wherein the cover comprises a rigid member of a larger dimension than the screen for transferring impact pressure to the frame.

21. The computer case of claim 20 wherein the rigid member is encapsulated within the compressible material of the cover.

22. The computer case of claim 19 wherein the cover is formed of two different compressible materials, the first of the materials surrounding a portion of the second of the materials, the first material having a density greater than the density of the second material.

23. The computer case of claim 1 wherein the cover is formed of two different compressible materials, the first of the materials surrounding a portion of the second of the materials, the first material having a density greater than the density of the second material.

24. The computer case of claim 11 wherein the cover is formed of two different compressible materials, the first of the materials surrounding a portion of the second of the materials, the first material having a density greater than the density of the second material.

* * * * *